United States Patent
Takai et al.

(10) Patent No.: US 8,661,622 B2
(45) Date of Patent: Mar. 4, 2014

(54) ASSIST GRIP

(75) Inventors: Hajime Takai, Kiyosu (JP); Chiharu Totani, Kiyosu (JP); Kazuhiro Kawamura, Anjo (JP); Shoji Kawakami, Toyota (JP)

(73) Assignees: Toyoda Gosei Co., Ltd., Aichi-pref. (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/638,265

(22) PCT Filed: May 10, 2011

(86) PCT No.: PCT/JP2011/061133
§ 371 (c)(1),
(2), (4) Date: Sep. 28, 2012

(87) PCT Pub. No.: WO2011/142475
PCT Pub. Date: Nov. 17, 2011

(65) Prior Publication Data
US 2013/0019437 A1 Jan. 24, 2013

(30) Foreign Application Priority Data
May 12, 2010 (JP) .................................. 2010-110550

(51) Int. Cl.
*A45C 3/00* (2006.01)
*B60N 3/02* (2006.01)
*E05B 1/00* (2006.01)

(52) U.S. Cl.
USPC ............... 16/445; 16/438; 296/1.02; 296/214

(58) Field of Classification Search
USPC ................... 16/405, 418, 429, 438, 444, 445, 16/DIG. 40, DIG. 41; 296/214, 71, 1.02
See application file for complete search history.

(56) References Cited

U.S. PATENT DOCUMENTS 5,855,408 A * 1/1999 Rickabus ...................... 296/214
6,397,435 B1 * 6/2002 Gosselet .......................... 16/438
(Continued)

FOREIGN PATENT DOCUMENTS

JP 2008-117074 A 5/2006
JP 2006-175990 A 7/2006
(Continued)

OTHER PUBLICATIONS

WO 2007009677 Description Machine Translation.*
(Continued)

*Primary Examiner* — Victor Batson
*Assistant Examiner* — Jason W San
(74) *Attorney, Agent, or Firm* — Posz Law Group, PLC (57) ABSTRACT

An assist grip includes hinges, spring cases, and coil springs. The hinges are provided with a rotary axis that a shaft-shaped protrusion and a pin make. The shaft-shaped protrusion is formed integrally with the hinges. The pin is formed independently of the hinges. The spring cases are held in a depression with which the hinges are provided, respectively. The coil springs urge the hinges by way of the spring cases in a direction for accommodating the hinges into hinge-holding depressions with which the assist grip is provided. The setup enables the resulting assist grip to offer better assemblage workability for assembly workers or robots, to show a better appearance, and to exhibit higher strength in service.

9 Claims, 8 Drawing Sheets

(56) References Cited

U.S. PATENT DOCUMENTS

| | | | |
|---|---|---|---|
| 6,467,130 B2* | 10/2002 | Kurachi et al. | 16/438 |
| 6,715,812 B2* | 4/2004 | Sakuma et al. | 296/1.02 |
| 6,836,932 B2* | 1/2005 | Yamamoto et al. | 16/110.1 |
| 6,969,100 B2* | 11/2005 | Totani et al. | 296/1.02 |
| 7,103,939 B2* | 9/2006 | Belchine et al. | 16/412 |
| 7,308,736 B2* | 12/2007 | Nakazato | 24/289 |
| 7,617,571 B2* | 11/2009 | Lee et al. | 16/412 |
| 7,988,115 B2* | 8/2011 | Lee et al. | 248/304 |
| 8,146,208 B2* | 4/2012 | Kajio et al. | 16/444 |
| 8,210,588 B2* | 7/2012 | Boehner et al. | 296/1.02 |
| 8,245,357 B2* | 8/2012 | Kajio et al. | 16/444 |
| 2008/0098563 A1* | 5/2008 | Lee et al. | 16/110.1 |
| 2009/0295180 A1* | 12/2009 | Boehner et al. | 296/1.02 |
| 2012/0080898 A1* | 4/2012 | Kajio et al. | 296/1.02 |
| 2013/0019437 A1* | 1/2013 | Takai et al. | 16/429 |

FOREIGN PATENT DOCUMENTS

| | | | | |
|---|---|---|---|---|
| JP | 2010-83239 | A | | 4/2010 |
| JP | 2010-083241 | A | | 4/2010 |
| JP | 2010083239 | A | * | 4/2010 |
| JP | 2010116031 | A | * | 5/2010 |
| JP | 2010159032 | A | * | 7/2010 |
| JP | 2010195161 | A | * | 9/2010 |
| JP | 2011025762 | A | * | 2/2011 |
| JP | 2011084259 | A | * | 4/2011 |
| JP | 4774464 | B1 | * | 9/2011 |
| JP | 2011235822 | A | * | 11/2011 |
| JP | 2011235823 | A | * | 11/2011 |
| JP | 2011235825 | A | * | 11/2011 |
| JP | 2011235826 | A | * | 11/2011 |
| WO | WO 2007009677 | A2 | * | 1/2007 ............ B60N 3/02 |

OTHER PUBLICATIONS

International Search Report of the International Searching Authority mailed Jun. 21, 2011 for the corresponding international application No. PCT/JP2011/061133 (with English translation).

Office Action mailed Sep. 17, 2013 in corresponding JP patent application No. 2010-110547 (and excerpt English translation).

* cited by examiner

ASSIST GRIP

The present application is a U.S. national stage of PCT/JP2011/061133 filed on May 10, 2011, and is based on and claims priority from Japanese Application No. 2010-110550 filed on May 12, 2010, the disclosure of which are incorporated herein by reference. The present application is also based on Japanese Application No. 2010-110547 filed on May 12, 2010, but does not claim priority to this application.

TECHNICAL FIELD

The present invention relates to an assist grip that is disposed in the passenger room of automobile, and which a passenger holds to support his or her own human body. More particularly, the present invention relates to an assist grip that comprises coil springs, and which can make the magnitude of protrusion into the passenger room reducible because the coil springs urge the assist grip so as to come along a wall face of the passenger room when it is not in service.

BACKGROUND ART

Assist grips are disposed in the passenger room of automobile in order that passengers can support their own bodies. Although the assist grips are available in stationary types, many of them have been coming recently to be used as rotary types. That is, a rotary type assist grip is disposed to come along a wall surface of passenger room when being out of service, and is rotated to come out when being in service so that passengers can grip it. Such a conventional rotary-type assist grip usually comprises a substantially-letter-U-shaped grip body, hinges, coil springs, and clips. The grip body is formed as a lengthy configuration, and has depressions for holding the hinges at the opposite side bases. The hinges are held rotatably in the hinge-holding depressions, respectively. The coil springs intervene between the hinges and the grip body to urge the hinges in a direction for accommodating the hinges into the hinge-holding depressions, respectively. The clips fix the hinges on a vehicle body because they are held on the hinges so as to engage with engagement holes that are formed in the vehicle body.

In the first conventional rotary-type assist grip, the clips fix the hinges on the vehicle body. When the first conventional rotary type assist grip is not used, an urging force resulting from the coil springs puts the grip body into the state that it comes along a wall face of passenger room, and so the grip body protrudes slightly into the passenger room. On the other hand, when the conventional rotary type assist grip is used, a passenger rotates the grip body about the rotary axis of the hinges against the urging force of the coil springs, thereby protruding the grip body into the passenger room. Thus, the passenger can grip the grip body, and hence can support his or her own body.

Japanese Unexamined Patent Publication (KOKAI) Gazette No. 2006-175,990, or Japanese Unexamined Patent Publication (KOKAI) Gazette No. 2006-117,074 proposes a second conventional rotary-type assist grip, for instance. This second conventional rotary-type assist grip comprises specific hinges and grip body. The hinges are provided with a pair of legs each of which has a through hole. The grip body is also provided with through holes that are formed in the hinge-holding depressions. Concretely speaking, the through holes are formed in two of the peripheral walls of the hinge-holding depressions, namely, in the right and left walls that face one another. This second conventional rotary-type assist grip can hold the hinges rotatably in the hinge-holding depressions because the through holes, which are formed in the hinges and the hinge-holding depressions, are put in place coaxially with each other, and because it further comprises pins that are pierced into the through holes.

However, in the second conventional rotary-type assist grip disclosed in the publications, the end face of the pins has been exposed in the outer surface of the hinge-holding depressions. Moreover, when a passenger rotates the grip body to use, the pins have come to be visible between the paired legs of the hinges. Therefore, the disclosed second conventional rotary-type assist grip has such a problem that it might be poor in the appearance because the pins' metallic luster is visible. In addition, in the disclosed second conventional rotary-type assist grip, the pins are knurled and are then fixed in the hinge-holding depressions by press fitting them into the through holes, in order to prevent the pins from coming off from the through holes. Consequently, the disclosed second conventional rotary-type assist grip is associated with such a drawback that it might be poor in the assemblage workability because greater man-hours might be required for press fitting the pins into the through holes.

Hence, Published Japanese Translation of PCT Application Gazette No. 2009-501,663 proposes a third conventional rotary-type assist grip in which the hinges are held rot at ably in the hinge-holding depressions. In the third conventional rotary-type assist grip, the hinges have a pair of legs that are provided with a shaft, respectively. The shafts are formed integrally with the legs to protrude outward therefrom. The hinge-holding depressions have peripheral walls, two of whose facing inner surfaces, right and left inner surfaces, are provided with a shaft hole, respectively. The shafts are engaged with the shaft holes rotatably, thereby holding the hinges rotatably in the hinge-holding depressions. The third conventional rotary-type assist grip has a better appearance because the setup makes the pins obsolete as well as makes the end of the protruding shafts invisible.

Moreover, Published Japanese Translation of PCT Application Gazette No. 2009-501,663 discloses such a design that gives a returning function to the grip body. That is, a spring case for accommodating coil spring is held between the paired legs of the hinges, respectively, thereby making the grip body returnable or retractable.

However, the third conventional rotary-type assist grip is associated with a drawback of poor assemblage workability because an assembly worker or robot engages the shafts with the shaft holes while deforming the paired legs of the hinges elastically so that they come nearer one another. Moreover, the third conventional rotary-type assist grip is also associated with another drawback that the shafts exhibit a lower strength than those of metallic pins because the shafts are made of resin. In addition, Published Japanese Translation of PCT Application Gazette No. 2009-501,663 does not disclose any specific construction for fixing the spring cases. Therefore, it is assumed that the spring cases might fall down or come off from the hinges.

DISCLOSURE OF THE INVENTION

The present invention has been developed in view of such circumstances. It is therefore an object of the present invention to provide an assist grip that offers good assemblage workability in assembling the hinges with the hinge-holding depressions, which shows a better appearance, which enables to securely prevent the constituent parts from falling down or coming off, and which exhibits high strength in service.

An assist grip according to the present invention can solve the aforementioned problems, and comprises:

a grip body being formed as a lengthy configuration, and having opposite side bases each of which is provided with a hinge-holding depression for holding hinge therein;

hinges being held rotatably in the hinge-holding depressions, respectively;

coil springs being interposed between the hinges and the grip body, and urging the hinges in a direction for accommodating the hinges into the hinge-holding depressions;

clips being held on the hinges, and engaging with engagement holes that are formed in a body of vehicle, thereby fixing the hinges on the vehicle body;

the hinge-holding depressions having a pair of side walls that face in a rotary-axis direction of the hinges, and each of the side walls having an inner surface that is provided with a bottomed bearing hole being free from penetrating through the side walls;

the hinges having a depression for holing case, the depression having a pair of side walls that face in the rotary-axis direction of the hinges, and the hinges further having a through hole that is provide in one of the side walls, and a shaft-shaped protrusion that is made coaxially with the through hole to project outward from another one of the side walls, respectively, and the hinges being accommodated in the hinge-holding depressions so that the shaft-shaped protrusion is inserted into one of the bottomed bearing holes in the hinge-holding depressions, and so that the through hole is communicated with another one of the bottomed bearing holes in the hinge-holding depressions;

the case-holding depressions having a pin that penetrates through the through hole in the hinges and the other one of the bottomed bearing holes in the hinge-holding depressions, and which is disposed coaxially with the shaft-shaped protrusion, respectively, thereby disposing the hinges rotatably with respect to the paired bottomed bearing holes;

one of the case-holding depressions further having a spring case that is held rotatably together with the hinges, and which is provided with a shaft being pierced into one of the coil springs; and the coil springs having opposite ends, one of which engages with the spring case and another one of which engages with the grip body, thereby urging the hinges by way of the spring case in the direction for accommodating the hinges into the hinge-holding depressions.

The assist grip according to the present invention can show a better appearance because the pins are not visible from the outside even when a passenger uses the present assist grip. Specifically, the pins are invisible from the outside because the pins are inserted at one of the opposite ends into the bottomed bearing holes, and because the pins are covered with the hinges and the spring case at the other one of the opposite ends. Moreover, the present assist grip can exhibit sufficient strength securely with use of metallic pins because the grip body rotates while being held at the opposite ends by the shaft-shaped protrusion that protrudes from the hinges and by the pins that are held in the bottomed bearing holes of the hinge-holding depressions. In addition, the present assist grip can help assembly workers or robots reduce the assemblage man-hour requirements because it is easy for assembly workers or robots to assemble the coil springs, the pins and the hinges together.

Moreover, the assist grip according to the present invention comprises the hinges that are urged by way of the spring case in the direction for accommodating them into the hinge-holding depressions because one of the coil springs engages with the spring case at one of the opposite ends, and with the grip body at the other one the opposite ends. Therefore, the present assist grip comprises the spring case that is prevented from falling down or coming off from one of the case-holding depressions because an urging force resulting from one of the coil springs presses the spring case toward the one of the case-holding depressions.

BEST MODE FOR CARRYING OUT THE INVENTION

When an assembly worker or robot assembles the above-described assist grip according to the present invention, the assembly worker or robot first puts the pins within the case-holding depressions of the hinges. Then, the assembly worker or robot inserts each of the pins into the through hole of the case-holding depressions, but retains the pins so as to keep the leading end from protruding to the outside. Then, the assembly worker or robot accommodates the hinges into the hinge-holding depressions. On this occasion, the assembly worker or robot not only engages the shaft-shaped protrusion of the hinges with one of the bottomed bearing holes, but also places the hinges so that the through-hole-side opposite end comes out of the hinge-holding depressions. Then, the assembly worker or robot can accommodate the hinges into the hinge-holding depressions readily by pressing the hinges toward the hinge-holding depressions at the through-hole-side opposite end. Thereafter, the assembly worker or robot presses the pins toward the other one of the bottomed bearing holes of the hinge-holding depressions to insert the pins into the bottomed bearing holes.

Alternatively, it is allowable that the assembly worker or robot can carry out the above-described assembly operation in the following manner. That is, the assembly worker, or robot can first accommodate the hinges into the hinge-holding depressions. Thereafter, the assembly worker or robot can put the pins in the case-holding depressions of the hinges. Then, the assembly worker or robot can insert the pins into the other one of the bottomed bearing holes in the hinge-holding depressions so as to pierce the pins into one of the facing walls of the case-holding depressions through the through hole.

Note that it is even allowable that the assembly worker or robot can attach the clips to the hinges in advance. It is also permissible that the assembly worker or robot can attach the clips to the hinges after the assembly worker or robot has completed accommodating the hinges in the hinge-holding depressions.

Subsequently, the assembly worker or robot inserts the spring case, whose shaft is pierced into one of the coil springs, into one of the case-holding depressions of the hinges. On this occasion, one of the coil springs engages with the spring case at one of the opposite ends, and engages with a part of the hinge-holding depression in the grip body at the other one of the opposite ends. Therefore, it is possible to stably hold the spring case in one of the case-holding depressions because it is possible to contract or wind up one of the coil springs as the spring case is inserted into the case-holding depression, and because the coil spring urges the spring case toward the case-holding depression at one of the opposite ends.

In the assist grip according to the present invention, it is preferable that the pins can have an opposite end protruding from the through hole of the hinges toward the case-holding depressions; and that the opposite end of the pins can have an end face facing an end face that the shaft of the spring case has. When the pins are thus constructed, it is possible to prevent the pins from failing down or coming off from the other one of the bottomed bearing holes in the hinge-holding depressions because the shaft of the spring case inhibits the pins from moving. Therefore, it is possible to reduce the assemblage man-hour requirements because it is not necessary to fit the pins into the bottomed bearing holes of the hinge-holding depressions. Moreover, it is also possible to prevent the present assist grip from chattering or rattling because the clearance between the end face of the pin and the end face of the shaft in the spring case can absorb configurational errors that occur when molding the constituent members. In addition, when the spring case is made of resin and the pins are made of metal, it is possible to inhibit abnormal noises from arising because different types of materials contact slidingly one another even if the end face of pins and the end face of the shaft should have contacted slidingly one another when the grip body rotates.

In the assist grip according to the present invention, it is preferable that the spring case can make a dually-dividable construction; the dually-dividable construction can have a major element having the shaft and being formed as a bottomed cylindrical shape, and a minor element being fixed to the major element; the minor element can have an opening into which a leading end of the shaft is inserted, and a guide groove that guides the pins in such a direction that the pins go toward the opening; and the guide groove can guide a leading end of the pins, which protrude from the through hole, so that the leading end of the pins faces the leading end of the shaft, which appears in the opening, when accommodating the spring case, whose shaft is pierced into one of the coil springs, into the one of the case-holding depressions. When the spring case is thus constructed, it is possible for the assembly worker or robot to readily house one of the coils springs into the coil spring case, and so it is possible to readily accommodate the spring case into one of the case-holding depressions eventually. Moreover, it is possible to contract or wind up one of the coil springs in order to accumulate an urging force therein by simply directing the spring case to and then inserting it into one of the case-holding depressions unidirectionally.

Moreover, the spring case can preferably have a projection that is made coaxially with the shaft, and which projects oppositely to an extending direction of the shaft; the hinges can preferably have a bottomed dent in another one of the paired side walls of the case-holding depressions; and the projection, and the bottomed dent can preferably engage with each other. If such is the case, it is possible to prevent the spring case from failing down or coming off from one of the case-holding depressions more reliably.

The thus assembled assist grip according to the present invention is fixed to a body of vehicle by way of the hinges because the clips, which are attached to the hinges, engage with installation holes that are formed in the vehicle body. The grip body is put in the state of coming along a wall surface of passenger room because the coil springs urge the hinges by way of the spring case in the direction for accommodating the hinges into the hinge-holding depressions. As a result, the grip body protrudes into the passenger room in a lesser magnitude. Then, when a passenger rotates the grip body to use, the coil springs accumulate an urging force furthermore. Consequently, the present assist grip gives the passenger a sense of being supported by a moderate load. That is, the present assist grip can produce a good feeling in use.

The assist grip according to the present invention can preferably further comprise the following construction. For example, it is preferable that the side walls of the spring case, and the side walls of the one of the case-holding depressions can have a slide dent and a slide projection, respectively; the slide dent, and the slide projection can engage with each other, thereby guiding the spring case that slides into the one of the case-holding depressions; the slide dent can have an inhibitor that not only makes the slide projection rotatable but also inhibits the slide projection from rotating after the slide projection slides to engage with the slide dent; the slide projection can slide in the slide dent to make one of the coil springs accumulate an urging force when accommodating the spring case, whose shaft is pierced into the one of the coil springs, into the one of the case-holding depressions; and the resulting urging force can rotate the slide projection to bring the slide projection into contact with the inhibitor, and then the inhibitor can inhibit the slide projection from rotating after the slide projection has finished sliding, thereby fixing the spring case in the one of the case-holding depressions.

When the assist grip according to the present invention further comprises the above-described additional construction, the sliding of the slide projection in the slide dent leads to accumulating an urging force in one of the coil springs. The resultant accumulated urging force rotates the spring case by a predetermined distance automatically. Then, the slide projection of the spring case makes contact with the inhibitor of the slide dent. As a result, the inhibitor not only inhibits the slide projection from rotating but also fastens the spring case to the one of the case-holding depressions. Therefore, it is possible to prevent the spring case from falling down or coming off from the one of the case-holding depressions more reliably when an assembly worker or robot assembles the present assist grip.

Moreover, it is preferable that the inhibitor and the slide projection can be constructed as follows: The inhibitor can project toward the slide dent in a direction of intersecting with another direction in which the slide dent and the slide projection slide one another; and the slide projection can rotate to lock on the inhibitor, thereby inhibiting the slide projection from moving in such a direction that the slide projection comes off from the slide dent. The thus constructed inhibitor and slide projection make it possible to prevent the spring case from falling down or coming off from the one of the case-holding depressions much more reliably.

EMBODIMENTS

Hereinafter, modes for embodying an assist grip according to the present invention will be described in detail with reference to some of the embodiments.

Embodiment No. 1

Figure 1:
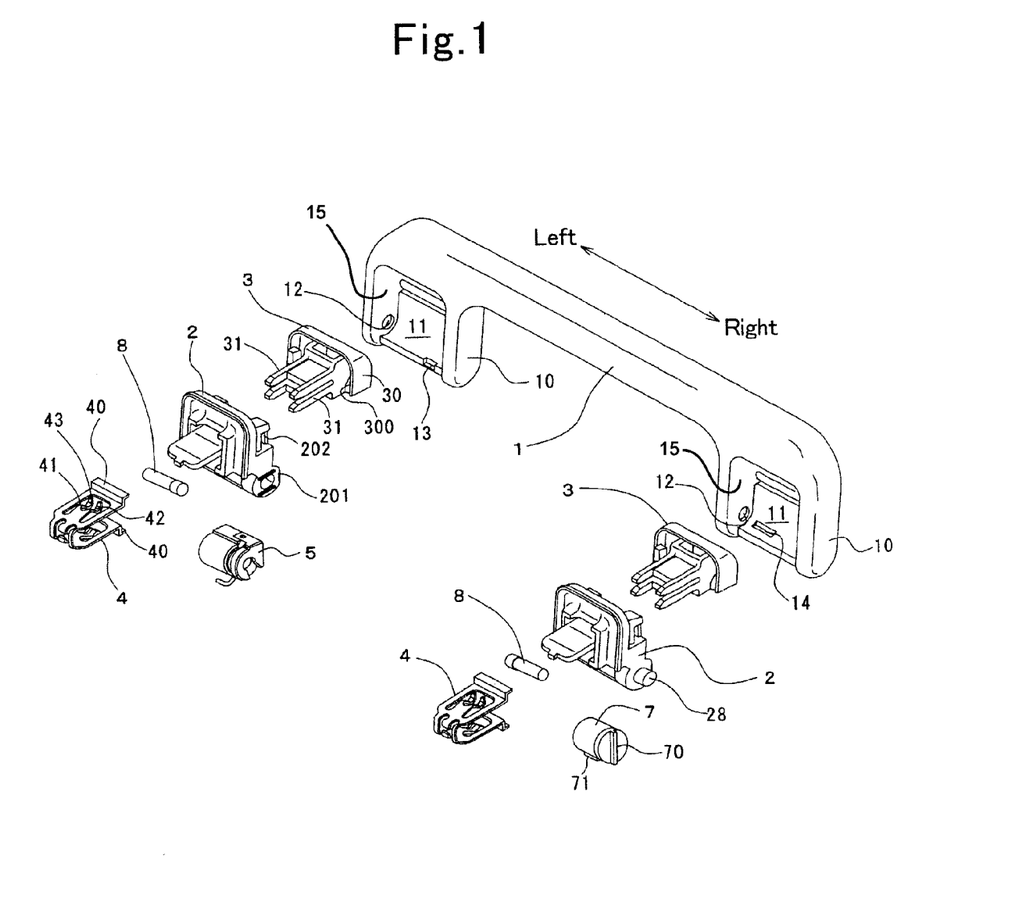
FIG. 1 is an exploded perspective diagram for illustrating an assist grip according to First Embodiment of the present invention.

An exploded perspective diagram of an assist grip according to Embodiment No. 1 of the present invention is illustrated in FIG. 1. The present assist grip comprises a grip body 1 that is made of resin. The grip body 1 is formed as a letter-U shape substantially, and comprises a rod-shaped grip, and a pair of bases 10. The bases 10 are formed respectively at the opposite ends of the grip body 1 in the extending direction of the rod-shaped grip (being referred to as "in the right/left direction" hereinafter).

The opposite ends of the grip body 1, namely, the bases 10 are provided with a hinge-holding depression 11, respectively. Moreover, the inner surfaces of the side walls in the bases 10 that are formed to demarcate the hinge-holding depressions 11, specifically, the right and left inner surface of the side walls 15 that face one another are provided with bottomed bearing holes 12, respectively. Note that the bottomed bearing holes 12 do not penetrate through the right and left side walls. In addition, the other inner surface of the side walls that are formed to demarcate one of the hinge-holding depressions 11 is provided with an engagement slot 13 for spring. Moreover, the other inner surface of the side walls that are formed to demarcate the other one of the hinge-holding depressions 11 is provided with another engagement slot 14 for damper.

Figure 2:
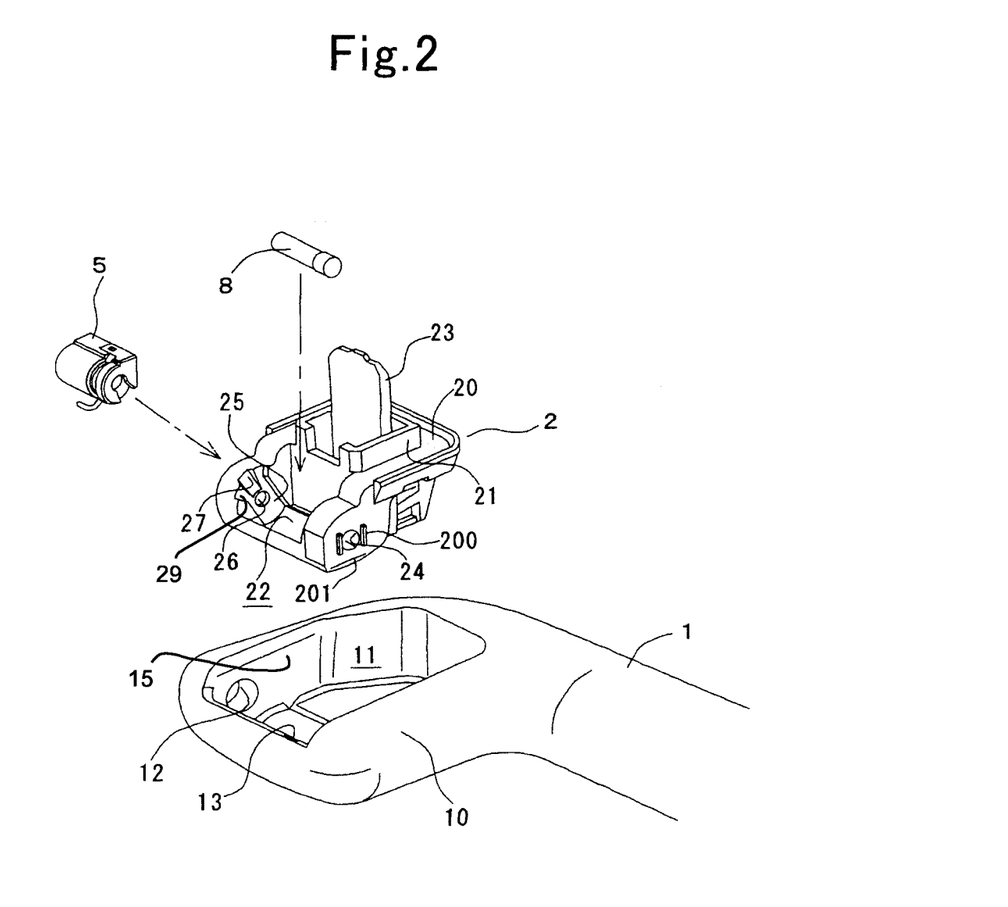
FIG. 2 is an exploded perspective diagram for illustrating a major part of the assist grip according to the First Embodiment.

The hinge-holding depressions 11 accommodate a hinge 2 and a cover 3 rotatably therein, respectively. Note that the hinge 2 is made of resin, and the cover 3 is made of another resin. The paired hinges 2 are formed as a mirror-symmetric configuration, respectively. Moreover, as shown in FIG. 2, the hinge 2 comprises a base 20, a frame 21, a case-holding depression 22, and a tongue piece 23. The frame 21 has a space that penetrates through the hinge 2 in the up/down direction in FIG. 2. The tongue piece 23 projects from within the frame 21.

In FIG. 2, the left-hand-side hinge 2 is shown. A through hole 24 is formed in the right side wall 29 of the case-holding depression 22 in the hinge 2. Note that the right side wall 29 is disposed on the inner side with respect to the left-hand-side base 10 of the grip body 1. Moreover, a dented-groove-shaped guide 25 is formed in the inner peripheral face of the left side wall 29 of the hinge 2 in which the through hole 24 is not formed. In addition, a bottomed dent 26, and a groove 27 are formed in the bottom of the guide 25. Note that the bottomed dent 26 does not penetrate through the left side wall 29 of the hinge 2. The groove 27 deepens gradually as it comes to the leading end from the dent 26.

Moreover, the left side wall 29 of the hinge 2 is provided with a shaft-shaped protrusion 28 (see FIG. 5) integrally. Note that the shaft-shaped protrusion 28 is disposed coaxially with the through hole 24 to protrude outward. In addition, the shaft-shaped protrusion 28 is provided with a chamfered section 280 at the leading end. Moreover, the outside surface of the right side wall 29 in the hinge 2 is provided with a pair of ribs 200 on the opposite sides that interpose the through hole 24 between them, as shown in FIG. 2. In addition, the outer surface of the right side wall 29 in the hinge 2 is provided with another chamfered section 201 that has a curved-surface configuration at a part that faces the case-holding depression 22 diagonally from down below. Note that it is even allowable that a cut-off or notch with a flat-surface configuration can substitute for the chamfered section 201.

As illustrated in FIG. 1, the covers 3 comprise a cap 30, and a pair of retainer plates 31, respectively. The cap 30 engages with the base 20 of the hinges 2 to be retained thereat. The paired retainer plates 31 project from the cap 30. The cap 30 is provided with a pair of engagement claws 300 that come to engage with a pair of cover engagements 202 with which the hinges 2 are provided on the opposite sides. Moreover, the paired retainer plates 31 are inserted into a rectangle-shaped space that the frame 21 of the hinges 2 makes. Note that the covers 3 are used in order to actually fix the present assist grip according to Embodiment No. 1 on a panel of vehicle body after temporarily fastening the present assist grip onto the vehicle-body panel.

The hinges 2 hold a metallic clip 4 shown in FIG. 1 therein, respectively. The clips 4 are formed as a letter-U configuration in cross section substantially. Specifically, the clips 4 are fabricated by bending a metallic plate that exhibits spring elasticity. The clips 4 are provided with an engagement 40 at each of the opposite leading ends. The engagement 40 is formed as a letter-L configuration in cross section, thereby engaging with the inner side of the frame 21 in the hinges 2. Moreover, the clips 4 are provided with curved finger-shaped tips 41. Each of the tips 41 is put in each of the rectangular cut-off spaces that the engagements 40 and the letter-U-shaped bent bottom make between them. The tips 41 can deform elastically in directions that they approach one another, and in directions that they separate from each other. In addition, the tips 41 are provided with a dented engagement 42, respectively. The dented engagements 42 engage with the rims of rectangular holes that are formed in a not-shown vehicle-body panel. Moreover, the tips 41 are divided into two parts at the leading end so that they are provided with two engagement claws 43, respectively.

Figure 3:
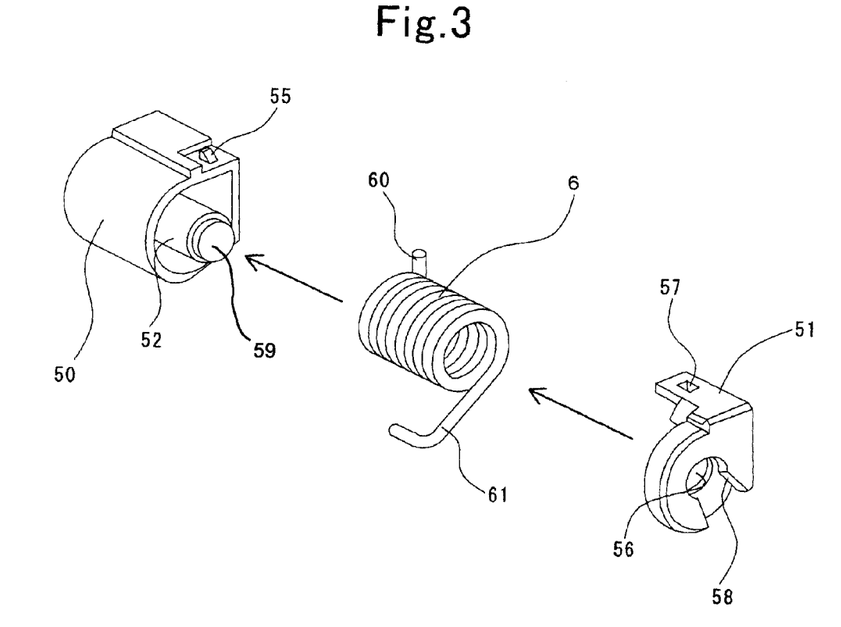
FIG. 3 is an exploded perspective diagram for illustrating a spring case that is used to make the assist grip according to the First Embodiment.

The case-holding depression 22 of one of the hinges 2 not only accommodates but also holds a spring case 5 therein. The spring case 5 is made of resin. As illustrated in FIG. 3, the spring case 5 comprises a bottomed cylinder-shaped major element 50, and a minor element 51 that integrates with the major element 50. The spring case 5 houses a coil spring 6 therein.

Figure 4:
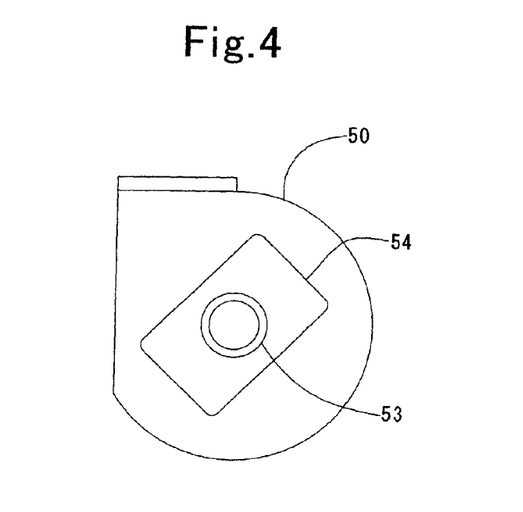
FIG. 4 is a front-view diagram for illustrating the spring case that is used to make the assist grip according to the First Embodiment, front-view diagram which is viewed perpendicularly to the rotary-axis direction of the spring case.

The major element 50 is provided integrally with a shaft 52 in the interior, and is provided with an engagement protrusion 55 on the outer peripheral surface. The shaft 52 is pierced into the coil spring 6. Moreover, the major element 50 is provided with a ring-shaped projection 53 and a rectangle-shaped guide protrusion 54 on the outer surface of the bottom, as shown in FIG. 4.

The minor element 51 is provided with an opening 56, and an engagement hole 57. The opening 56 engages with the leading end of the shaft 52 of the major element 50. The engagement hole 57 engages with the engagement protrusion 55 of the major element 50. Moreover, the minor element 51 is provided with a sector-shaped cut-off 58 on one of the opposite end faces. The cut-off 58 communicates with the opening 56.

When an assembly worker or robot assembles the spring case 5, the assembly worker or robot first pierces the shaft 52 of the major element 50 into the coil spring 6 to house the coil spring 6 in the major element 50. On this occasion, the coil spring 6 is put in such a state that one of the opposite ends, a short end 60, is housed in the major element 50 and another opposite end 61, which is bent as letter-L shape, is protruded from out of the major element 50. Then, while inserting the shaft 52 of the major element 50 into the opening 56 of the minor element 51, the assembly worker or robot engages the engagement projection 55 of the major element 50 with the engagement hole 57 of the minor element 51 to combine the major element 50 with the minor element 51. Note that, in the completed spring case 5, the letter-L-shaped opposite end 61 of the coil spring 6 projects from out of a clearance that is formed between the major element 50 and the minor element 51, and can move freely in the circumferential direction of the spring case 5. However, the coil spring 6 is inhibited from rotating by the short end 60 that comes in contact with an inner wall of the major element 50.

The right-hand-side hinge-holding depression 11 of the grip body 1 accommodates to hold the other one of the hinges 2 therein in the same manner as the left-hand-side hinge holing depression 11 does. However, in the assist grip according Embodiment No. 1, the case-holding depression 22 of the right-hand-side hinge 2 accommodates to hold an oil damper 7 therein, instead of the spring case 5. The oil damper 7 is provided with a linear-shaped rib 70 at the leading end of the damper shaft, and is provided with an engagement projection 71 on the outer peripheral face of the outer case. Note that the right-hand-side hinge 2 is provided with a not-shown dent, which engages with the rib 70 of the oil damper 7, on the inner peripheral surface of the side right wall in the case-holding depression 22. Since the rib 70 of the oil damper 7 engages with the not-shown dent of the hinge 2, the damper shaft of the oil damper 7 is fixed to the case-holding depression 22 of the hinge 2. Moreover, since the engagement projection 71 of the oil damper 7 engages with the damper-engagement slot 14 of the grip body 1, the outer case of the oil damper 7 is fixed to the hinge-holding depression 11.

Therefore, when a passenger rotates the grip body 1 with respect to the hinges 2, the oil damper 7 rotates so as to apply a moderate rotary resistance to the grip body 1 because the damper shaft of the oil damper 7 first rotates with respect to the outer case and then the outer case starts rotating retardingly due to the shear viscosity of oil being held therein.

Figure 5:
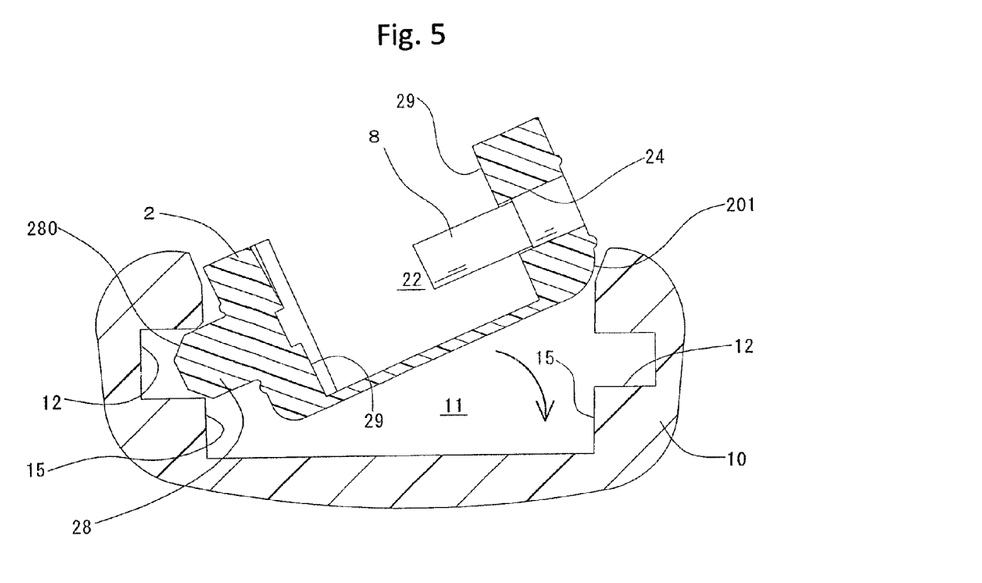
FIG. 5 is a cross-sectional diagram for illustrating how to assemble the assist grip according to the First Embodiment wherein a hinge is inserted into a hinge-holding depression.

When an assembly worker or robot assembles the thus constructed component parts together, the assembly worker or robot first puts the metallic pins 8 in the case-holding depression 22 of the paired hinges 2, for instance, as shown in FIG. 5. Since the pins 8 are provided with a major-diameter section 80 at the leading end, the assembly worker or robot inserts the major-diameter section 80 into the through hole 24 of the hinges 2. On this occasion, the assembly worker or robot retains the pin 8 in the hinge 2 so that the leading end does not protrude to the outside of the hinge 2. Then, the assembly worker or robot inserts each of the hinges 2, which thus retain the pins 8, into each of the hinge-holding depressions 11 of the grip body 1.

Figure 6:
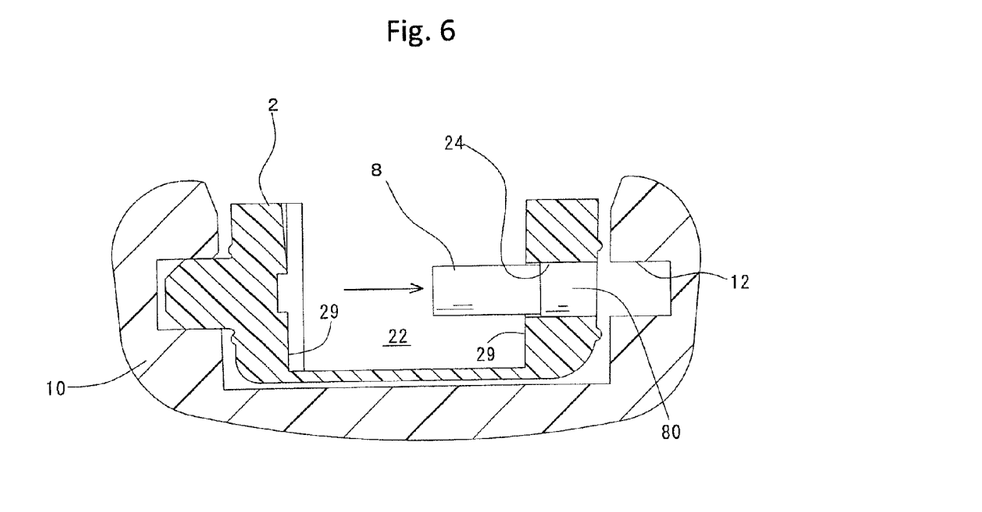
FIG. 6 is another cross-sectional diagram for illustrating how to assemble the assist grip according to the First Embodiment wherein a pin is fitted into a bottomed bearing hole.

In that instance, the assembly worker or robot not only engages the shaft-shaped protrusion 28 of the hinges 2 with one of the bottomed bearing holes 12 of the grip body 1 but also positions the hinges 2 so that the opposite end with the through hole 24 provided comes out from out of the hinge-holding depressions 11, as shown in FIG. 5. Thus, the assembly worker or robot inclines the hinges 2 with respect to the hinge-holding depressions 11. Then, the assembly worker or robot presses the hinges 2 toward the hinge-holding depressions 11 at the opposite end having the through hole 24. On this occasion, since the chamfered section 280 and chamfered section 201 of the hinges 2 guide the hinges 2 proper, it is possible for the assembly worker or robot to accommodate the hinges 2 into the hinge-holding depressions 11 with ease, as shown in FIG. 6. As a result, the through hole 24 of the hinges 2 readily communicate with the other one of the bottomed bearing holes 12 of the grip body 1.

Figure 7:
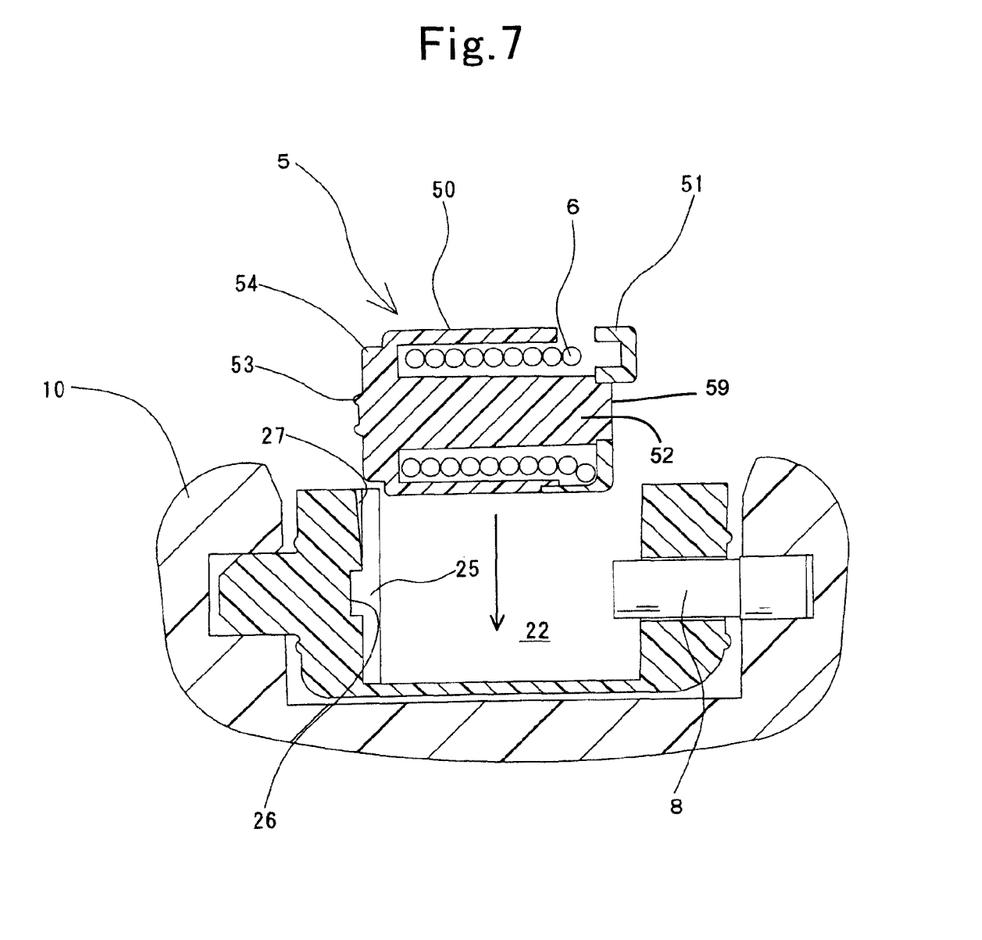
FIG. 7 is still another cross-sectional diagram for illustrating how the assist grip according to the First Embodiment is assembled before a spring case is accommodated into the case-holding depress ion.

Next, the assembly worker or robot presses the pin 8 toward the other one of the bottomed bearing holes 12 of the hinge-holding depression 11 to fit the pin 8 into the other bottomed bearing hole 12, as shown in FIG. 6, Accordingly, the pin 8 is fixed in the other bottomed bearing hole 12 at the leading-end major-diameter section 80. Consequently, the shaft-shaped protrusion 28 and pin 8 hold the hinge 2 proper rotatably in the hinge-holding depression 11. As illustrated in FIG. 7, the pin 8 projects slightly into the case-holding depression 22 at one of the opposite ends that is opposite to the major-diameter section 80.

In the present assist grip according to Embodiment No. 1, the major-diameter section 80 of the pins 12 is fitted into and is then fixed in the other bottomed bearing hole 12 of the hinge-holding depressions 11. However, instead of such an assembling manner, it is also possible to simply insert pins 8, which are free from the major-diameter section 80, into the other bottomed bearing hole 12 at one of the opposite ends.

Subsequently, the assembly worker or robot accommodates the spring case 5, in which the major element 50 and minor element 51 are combined to house the coil spring 6, into the case-holding depression 22 in one of the hinges 2, as shown in FIG. 7. On this occasion, the guide 25 of the hinge 2 guides the guide protrusion 54 with which the major element 50 is provided at one of the opposite ends, the groove 27 guides the ring-shaped projection 53, and the guide groove 58, which is formed as a sector-shaped cut-off configuration, guides the protruded opposite end of the pin 8, thereby helping the assembly worker or robot accommodate the spring case 5 into the case-holding depression 22. As the assembly worker or robot inserts the guide projection 54 into the guide 25, the coil spring 6 accumulates an urging force therein because the spring engagement 13 of the left-hand-side case-holding depression 11 comes in contact with and then presses the other end 61 of the coil spring 6. The spring case 5 has opposing side walls, one opposing side wall of the spring case 5 can have the configuration shown in FIG. 3 that corresponds to the leading-end face 59 of the shaft 52. Another opposing side wall of the spring case 5 can have the configuration shown in FIG. 10 that corresponds to a guide protrusion 500.

Figure 8:
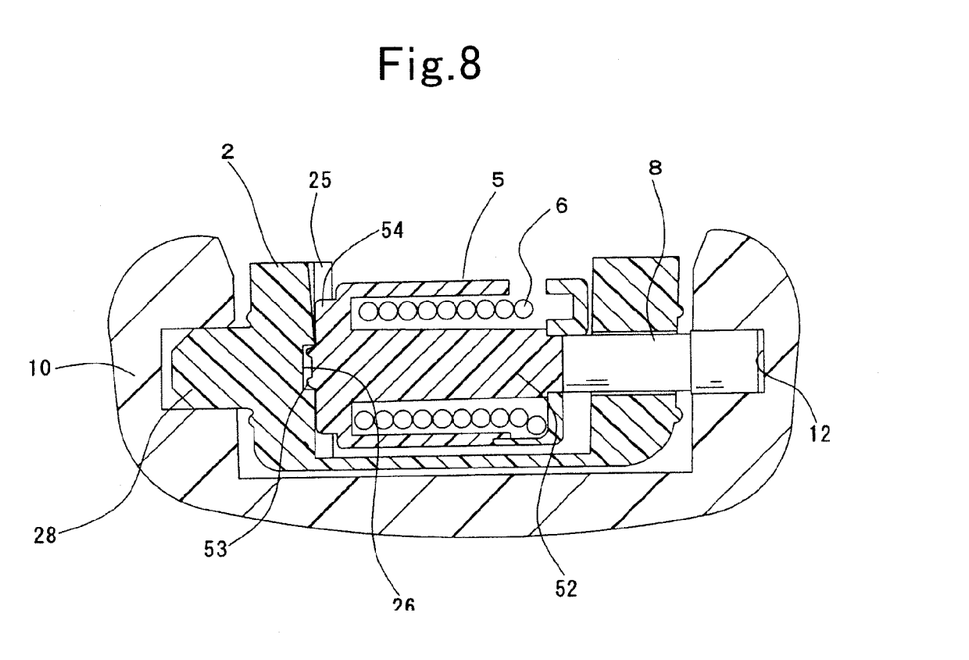
FIG. 8 is a cross-sectional diagram for illustrating a major part of the assist grip according to the First Embodiment.

Then, at the final stage of accommodating the spring case 5 into the left-hand-side case-holding depression 22, the assembly worker or robot completes the accommodation in the following manner: the ring-shaped projection 53 of the major element 50 engages with the dent 26 of the case-holding depression 22 as well as the leading-end face 59 of the shaft 52 faces the trailing-end face of the pin 8 with a minute clearance provided therebetween, as shown in FIG. 8. Hence, the spring case 5 is fixed integrally with the hinge 2 without ever rotating because the paired guide rails making the guide 25 of the hinge 2 hold the opposite ends of the rectangle-shaped guide projection 54 of the spring case 5 therebetween, and because the accumulated urging force of the coil spring 6 presses the spring case 5 onto the hinge 2.

Finally, the assembly worker or robot holds the clips 4 in the hinges 2 to complete the present assist grip according to Embodiment No. 1, that is, to make the present assist grip installable to a panel of vehicle body in the following manner. For example, the assembly worker or robot first inserts the tongue piece 23 of the hinges 2 between the paired engagements 40 of the clips 4. Then, the assembly worker or robot penetrates the paired engagements 40 through the frame 21 of the hinges 2 to engage the paired engagements 40 of the clips 4 with the rear-face sides of the frame 21 in the hinges 2 while holding the engagements 40 down so that they approach one another. Thereafter, the thus assembled present assist grip is sent to an automotive assembly line. An automotive-assembly-line worker or robot fits the clips 4 by pressing into not-shown rectangular holes that are formed in a panel of vehicle body. Accordingly, the clips 4 undergo elastic deformation so that the paired curved finger-shaped tips 41 approach one another. When the curved finger-shaped tips 41 penetrate through the rectangular holes, the curved finger-shaped tips 41 restore their own configuration because of the resultant elastic reactive force that arises in them. Consequently, the curved finger-shaped tips 41 engage with the opposite rims of the rectangular holes at the dented engagements 42. As a result, the automotive-assembly-line worker fastens the present assist grip onto the vehicle-body panel temporarily. Finally, the automotive-assembly-line worker or robot inserts the paired retainer plates 31 of the covers 3 into the frames 21 of the hinges 2 from the rear in order to prevent the paired curved finger-shaped tips 41 from approaching. Thus, the automotive-assembly-line worker or robot fixes the present assist grip on the vehicle-body panel actually. In this instance, note that the engagement between the engagement claws 300 of the covers 30 and the cover engagements 202 of the hinges 2 fixes the covers 3 and the hinges 2 with each other.

Therefore, the present assist grip according to Embodiment No. 1 shows a better appearance because the pins 8 are invisible from the outside when a passenger uses the present assist grip. Concretely speaking, the pins 8 are invisible in service because the pins 8 are fitted into the bottomed bearing holes 12 of the grip body 1 at one of the opposite ends, and because the other parts of the pins 8 are covered not only with the hinges 2 but also with the spring case 5. Moreover, since the pins 8, and the shaft-shaped protrusion 28 that projects from the hinges 2 make the axial center about which the grip body 1 rotates, using the metallic pins 8 can give the present assist grip a sufficient strength securely. In addition, since not only the assembly of the coil spring 6 with the spring case 5 but also the assembly of the pins 8 with the hinges 2 are made easier extremely, the present assist grip enables assembly workers or robots to remarkably reduce the assemblage man-hour requirements.

Embodiment No. 2

An assist grip according to Embodiment No. 2 of the present invention comprises the same constituent parts as those of the present assist grip according to Embodiment No. 1 fundamentally. However, the hinges 2 and spring case 5 have different configurations from those in the present assist grip according to Embodiment No. 1. Therefore, only the distinct constituent parts will be hereinafter described. Moreover, the same reference numerals as those in Embodiment No. 1 are also given to the constituent elements of the present assist grip according to Embodiment No. 2 that have the same functions as those in Embodiment No. 1 in order describe them.

Figure 9:
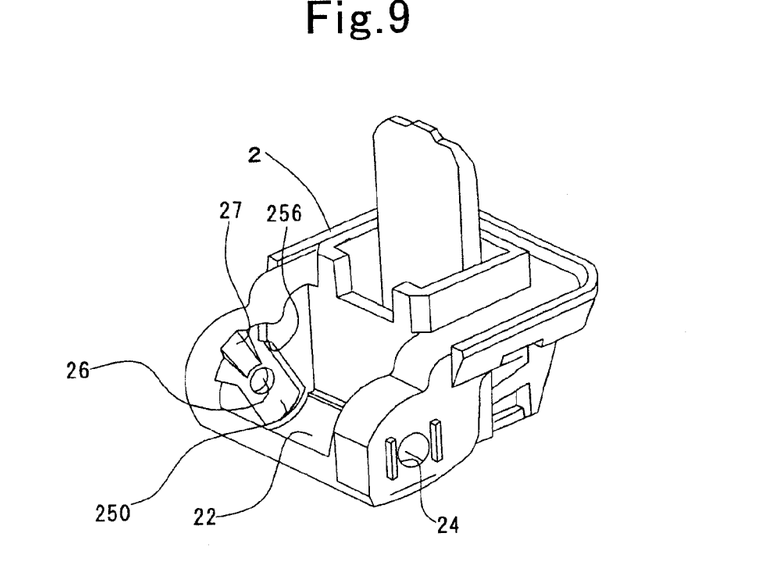
FIG. 9 is a perspective diagram for illustrating a hinge that is used to make an assist grip according to Second Embodiment of the present invention.

FIG. 9 illustrates a left-hand-side hinge 2. The hinge 2 is provided with a through hole 24 in the right side wall 29 of the case-holding depression 22. Note that the right side wall 29 is disposed on the inner side with respect to the left-hand-side base 10 of the grip body 1. Moreover, the hinge 2 is provided with a dented-groove-shaped guide 250 in the inner peripheral face of the left side wall 29 in which the through hole 24 is not formed. In addition, the hinge 2 is provided with a bottomed dent 26 and a groove 27 in the bottom of the guide 250. Note that the bottomed dent 26 is formed so as not to penetrate through the left side wall 29 of the hinge 2. The groove 27 is formed so as to deepen gradually as it comes to the leading end from the dent 26.

Figure 10:
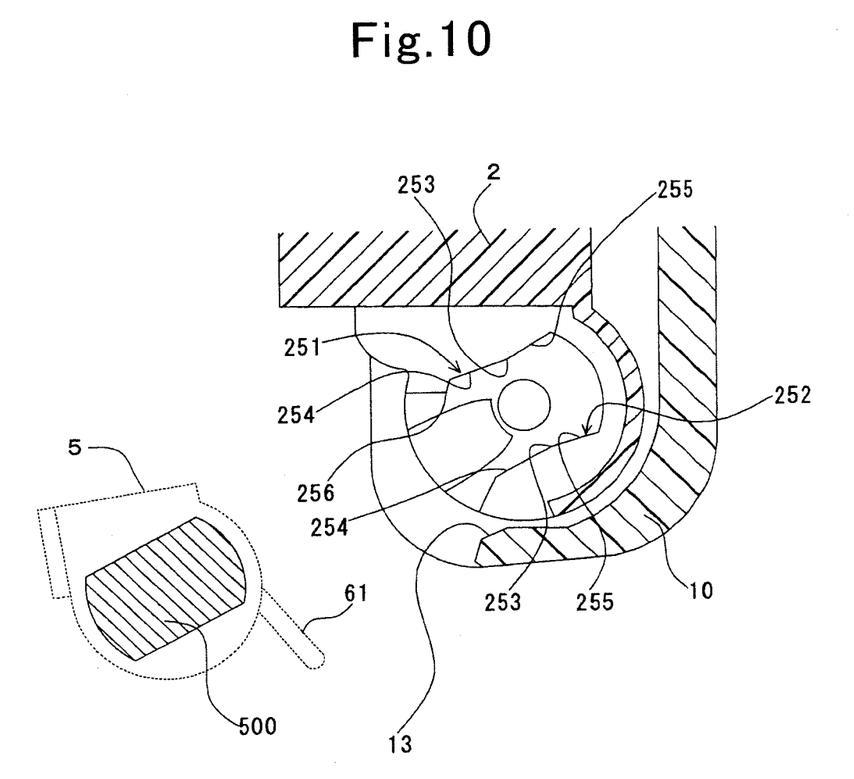
FIG. 10 is an explanatory cross-sectional diagram for illustrating how the assist grip according to the Second Embodiment is assembled before a spring case is accommodated into a case-holding depression.

FIG. 10 illustrates the guide 250 in an enlarged manner. As illustrated in the drawing, the guide 250 is made of a pair of guide rails 251 and 252. The guide rails 251 and 252 include a constricted section 253, an inlet-side diametrically-enlarging section 254, and an interior-side diametrically-enlarging section 255, respectively. The constricted sections 253 exhibit an interval that narrows down at the center of the guide 250. The inlet-side diametrically-enlarging sections 254 exhibit an interval that enlarges as they come to the opening of the guide 250 from the constricted sections 253. The interior-side diametrically-enlarging sections 255 exhibit an interval that enlarges as they come to the interior of the guide 250 from the constricted sections 253. Moreover, one of the guide rails 251 and 252, the upper guide rail 251 in the drawing, for instance, is provided with a detent protrusion 256 at the inlet-side diametrically-enlarging section 254. Note that the detent protrusion 256 protrudes toward the inlet-side diametrically-enlarging section 254 of the other guide rail 252.

Moreover, as also shown in. FIG. 10, the main element 50 of the spring case 5 is provided with a substantially-rectangular-shaped guide protrusion 500 on the outer surface of the another opposing side wall of the spring case 5. Note that the outer surface of the another opposing side wall of spring case 5 herein designates an outer surface of the main element 50 that makes the root-side end of the shaft 52, and which does not appear in corresponding FIG. 3. The guide protrusion 500 is formed so as to have shorter sides whose length is not only equal to the distance from the apex of the detent protrusion 256 to the guide rail 252 but also equal to the interval distance between the constricted sections 253 of the guide rail 251 and guide rail 252.

Figure 11:
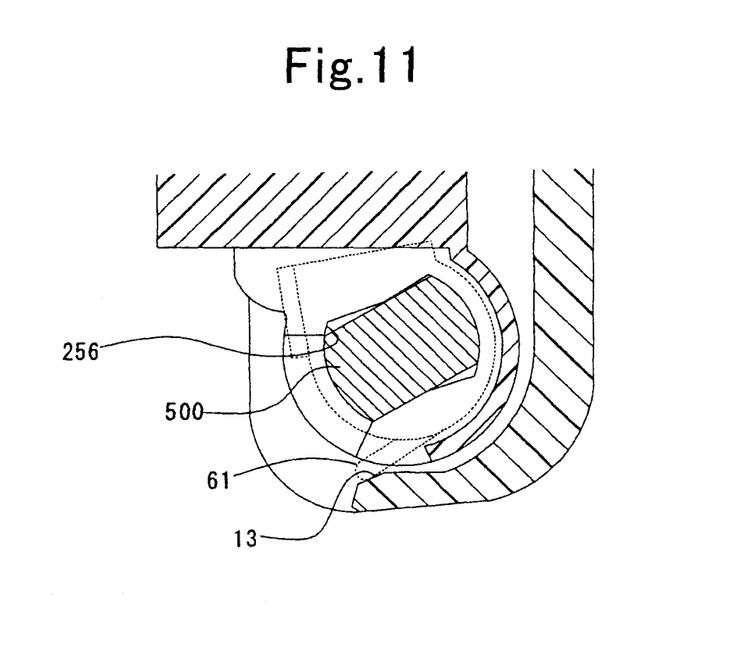
FIG. 11 is another explanatory cross-sectional diagram for illustrating how the assist grip according to the Second Embodiment is assembled after the spring case has been accommodated in the case-holding depression but before the spring case is rotated.

When an assembly worker or robot assembles the assist grip according to Embodiment No. 2, the assembly worker or robot first inserts the guide protrusion 500 of the main element 50 in the spring case 5 into the guide 250 of the case-holding depression 22 in the hinge 2, as shown in FIG. 11, upon inserting the spring case 5 into the case-holding depression 22. Then, the inlet-side diametrically-enlarging section 254 of the guide rail 252 guides the guide protrusion 500 so that the guide protrusion 500 penetrates into the guide 250 without ever interfering with the detent protrusion 256 of the guide rail 251. After the leading end of the guide protrusion 500 has passed the constricted sections 253, the guide protrusion 500 further penetrates into the guide 250 while being guided by the interior-side diametrically-enlarging section 255 of the guide rail 251. As the guide protrusion 500 goes into the guide 250, the coil spring 6 accumulates an urging force therein because the spring engagement 13 of the left-hand-side case-holding depression 11 comes in contact with the longer L-shaped other end 61 of the coil spring 6 and then presses the coil spring 6 at the other end 61. Moreover, the guide groove 27 of the hinge 2 guides the ring-shaped projection 53 of the major element 50 in the spring case 5. In addition, on the other opposite end of the spring case 5 that is opposite to the root-side being provided with the guide protrusion 500, the guide groove 58 having a sector-shaped cut-off configuration guides one of the opposite ends of the pin 8. Eventually, the assembly worker or robot finishes housing the spring case 5 into the case-holding depression 22 of the hinge 2.

Thus, at the final stage of accommodating the spring case 5 into the left-hand-side case-holding depression 22, the spring case 5 is housed within the case-holding depression 22 in such a state that not only the ring-shaped projection 53 of the major element 50 engages with the dent 26 of the hinge 2 but also the leading-end face of the pin 8 and the leading-end face of the shaft 52 face one another while being separated from each other by a minute clearance, as shown in FIG. 8. In this instance, note that the guide protrusion 500 makes contact with the interior-side diametrically enlarging section 255 of the guide rail 251, and with the inlet-side diametrically-enlarging section 254 of the guide rail 252, as shown in FIG. 11, when the assembly worker or robot has completed accommodating the spring case 5 into the case-holding depression 22.

Figure 12:
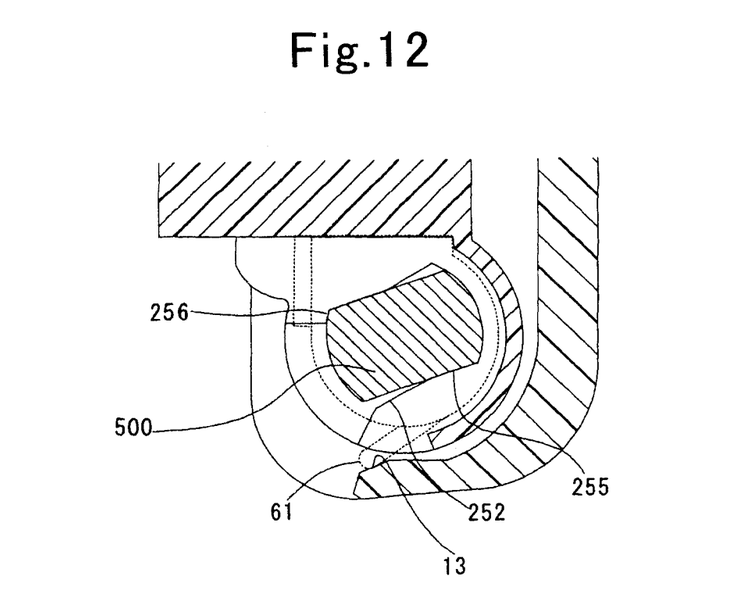
FIG. 12 is still another explanatory cross-sectional diagram for illustrating how the assist grip according to the Second Embodiment is assembled after the spring case has been accommodated in the case-holding depression and after the spring case has been rotated.

Subsequently, when the assembly worker or robot stops pressing the spring case 5 upon completing the insertion of the spring case 5 into the case-holding depression 22, the coil spring 6 urges the guide protrusion 500 at the shorter opposite end 60 to rotate the spring case 5 by about 10 degrees in the clockwise direction in FIG. 11. As a result, the spring case 5 is inhibited from rotating furthermore because the guide protrusion 500 makes contact with the inner surface of the detent protrusion 256 as well as with the interior-side diametrically-enlarging section 255 of the guide rail 252, as shown in FIG. 12.

As described above, the present assist grip according to Embodiment No. 2 can therefore help assembly workers or robots prevent the spring case 5 from falling down or coming off from the hinge 2 more reliably because the spring case 5 and the hinge 2 are fixed with each other integrally. More precisely, the spring case 5 is held firmly in the hinge 2 because an urging force resulting from the coil spring 6 not only presses the spring case 5 onto the hinge 2 but also presses the guide protrusion 500 of the major member 50 in the spring case 5 onto the guide rail 252 of the guide 250 in the hinge 2, and because the detent protrusion 256 of the guide 250 locks the outer end face of the guide protrusion 500 on the interior surface.

The invention claimed is:

1. An assist grip, comprising:
a grip body having an elongated configuration with opposite side bases, each opposite side base having a hinge-holding depression;
hinges being rotatably held by the hinge-holding depressions;
clips holding the hinges, the clips configured to engage with a vehicle body and to fix the hinges on the vehicle body;
each hinge-holding depression having opposing side walls that face in a rotary-axis direction of the hinge, each opposing side wall having an inner surface with a bottomed-bearing hole, the bottomed-bearing hole extending into the inner surface but not penetrating through the opposing side wall of the hinge-holding depression;
each hinge having a case-holding depression, the case-holding depression having opposing side walls that face in the rotary-axis direction of the hinge, a through hole being provided in one of the opposing side walls and a shaft-shaped protrusion projecting outward from another one of the opposing side walls of the case-holding depression, the shaft-shaped protrusion of each case-holding depression extending coaxially with the through hole, and each hinge is accommodated in each hinge-holding depression by inserting the shaft-shaped protrusion of the case-holding depression into one of the bottomed-bearing holes and by coaxially arranging the through hole with another one of the bottomed-bearing holes in each hinge-holding depression;
the case-holding depression of each hinge having a pin that penetrates past the through hole in each hinge-holding depression and into the another one of the bottomed bearing holes in the hinge-holding depression, and each hinge being rotatably arranged within each hinge-holding depression by the shaft-shaped protrusion and the pin of each case-holding depression being rotatably received in the bottomed-bearing holes of the hinge-holding depression;
a coil spring being interposed between one hinge of the hinges and the grip body, the coil spring urging the one hinge in a direction for accommodating the one hinge into one of the hinge-holding depressions;
one of the one case-holding depressions further comprising a spring case that is held rotatably together with the one hinge containing the coil spring, the spring case having opposing walls and one of the opposing walls faces a front end of the pin of the one hinge; and
the coil spring having opposite ends, one of the ends engaging with the spring case and another one of the ends engaging the grip body, and the coil spring being arranged and configured to force the one hinge in a direction for accommodating the one hinge into the one hinge-holding depression.

2. The assist grip according to claim 1, wherein:
each pin has a leading end protruding from the through hole of each hinge toward each case-holding depression; and
the leading end of one of the pins has an end face facing the one opposing wall of the spring case.

3. The assist grip according to claim 2, wherein:
the spring case has a dually-dividable construction;
the dually-dividable construction includes a major element with a shaft, the shaft being formed as a bottomed cylindrical shape, the shaft piercing the coil spring; and
a minor element fixed to the major element, the minor element has an opening and a guide groove, the opening receiving a leading end of the shaft of the major element, and the guide groove guiding a leading end of the pin that protrudes from the through hole of the one case-holding depression in a direction toward the opening of the minor element and to an opposing wall the shaft.

4. The assist grip according to claim 3, wherein:
the spring case has a projection extending coaxially with the shaft, and the projection extending in a direction opposite an extending direction of the shaft;
the one hinge has a bottomed dent in the another one of the opposing side walls of the one case-holding depression; and
the projection and the bottomed dent engage with each other.

5. The assist grip according to claim 1, wherein:
another one of the opposing walls of the spring case is configured as a guide protrusion, and the one side wall of the one case-holding depression has a guide, the guide protrusion engaging with and sliding along the guide and guiding the spring case that slides into the one case-holding depression;

the guide has a detent protrusion configured to permit the guide protrusion to initially rotate but then to inhibit the guide protrusion from rotating after the guide protrusion slides to engage with the guide;

the guide protrusion is configured to slide in the guide making the coil spring accumulate an urging force when accommodating the spring case and the coil spring scratch that into the one case-holding depression; and the resulting urging force rotates the guide protrusion to bring the guide protrusion into contact with the detent protrusion, and then the detent protrusion inhibits the guide protrusion from rotating after the guide protrusion has finished sliding, and the spring case is fixed in the one case-holding depression.

6. The assist grip according to claim 5, wherein:

the detent protrusion projects toward the guide in a direction of intersecting with another direction in which the guide and the guide protrusion slide along one another; and the guide protrusion rotates to lock on the detent protrusion, thereby inhibiting the guide protrusion from moving in such a direction that the guide protrusion comes off from the guide.

7. The assist grip according to claim 1, wherein one of the case-holding depressions has a damper.

8. An assist grip, comprising:

a grip body having an elongated configuration with opposite side bases, each opposite side base having a hinge-holding depression;

hinges being rotatably held by the hinge-holding depressions;

clips holding the hinges, the clips configured to engage with a vehicle body and to fix the hinges on the vehicle body;

each hinge-holding depression having opposing side walls that face in a rotary-axis direction of the hinge, each opposing side wall having an inner surface with a bottomed-bearing hole, the bottomed-bearing hole extending into the inner surface but not penetrating through the opposing side wall of the hinge-holding depression;

each hinge having a case-holding depression, the case-holding depression having opposing side walls that face in the rotary-axis direction of the hinge, a through hole being provided in one of the opposing side walls and a shaft-shaped protrusion projecting outward from another one of the opposing side walls of the case-holding depression, the shaft-shaped protrusion of each case-holding depression extending coaxially with the through hole, and each hinge is accommodated in each hinge-holding depression by inserting the shaft-shaped protrusion of the case-holding depression into one of the bottomed-bearing holes and by coaxially arranging the through hole with another one of the bottomed-bearing holes in each hinge-holding depression;

the case-holding depression of each hinge having a pin that penetrates past the through hole in each hinge-holding depression and into the another one of the bottomed bearing holes in the hinge-holding depression, and each hinge being rotatably arranged within each hinge-holding depression by the shaft-shaped protrusion and the pin of each case-holding depression being rotatably received in the bottomed-bearing holes of the hinge-holding depression;

a coil spring being interposed between one hinge of the hinges and the grip body, the coil spring urging the one hinge in a direction for accommodating the one hinge into one of the hinge-holding depressions;

one of the one case-holding depressions further comprising a spring case that is held rotatably together with the one hinge containing the coil spring, the spring case having opposing walls and one of the opposing walls faces a front end of the pin of the one hinge;

the coil spring having opposite ends, one of the ends engaging with the spring case and another one of the ends engaging the grip body, and the coil spring being arranged and configured to force the one hinge in a direction for accommodating the one hinge into the one hinge-holding depression; and another one of the opposing walls of the spring case configured as a guide protrusion, and the one side wall of the one case-holding depression has a guide, the guide protrusion engaging with and sliding along the guide and guiding the spring case that slides into the one case-holding depression;

the guide has a detent protrusion configured to permit the guide protrusion to initially rotate but then to inhibit the guide protrusion from rotating after the guide protrusion slides to engage with the guide;

the guide protrusion is configured to slide in the guide making the coil spring accumulate an urging force when accommodating the spring case and the coil spring into the one case-holding depression; and the resulting urging force rotates the guide protrusion to bring the guide protrusion into contact with the detent protrusion, and then the detent protrusion inhibits the guide protrusion from rotating after the guide protrusion has finished sliding, and the spring case is fixed in the one case-holding depression.

9. The assist grip according to claim 8, wherein:

the detent protrusion projects toward the guide in a direction of intersecting with another direction in which the guide and the guide protrusion slide along one another; and the guide protrusion rotates to lock on the detent protrusion, thereby inhibiting the guide protrusion from moving in such a direction that the guide protrusion comes off from the guide.

* * * * *